United States Patent
Huang et al.

(10) Patent No.: US 11,858,126 B2
(45) Date of Patent: Jan. 2, 2024

(54) ROBOT JOINT AND METHOD FOR SEALING A JOINT GAP OF A ROBOT JOINT

(71) Applicant: ABB Schweiz AG, Baden (CH)

(72) Inventors: Jiangwei Huang, Västerås (SE); Arne Trangärd, Västerås (SE); Shanghua Li, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/270,244

(22) PCT Filed: Aug. 29, 2018

(86) PCT No.: PCT/EP2018/073171
§ 371 (c)(1),
(2) Date: Feb. 22, 2021

(87) PCT Pub. No.: WO2020/043276
PCT Pub. Date: Mar. 5, 2020

(65) Prior Publication Data
US 2021/0245373 A1    Aug. 12, 2021

(51) Int. Cl.
*B25J 17/00* (2006.01)
*B25J 19/00* (2006.01)
*B25J 17/02* (2006.01)

(52) U.S. Cl.
CPC .......... *B25J 19/0075* (2013.01); *B25J 17/02* (2013.01); *B25J 19/0058* (2013.01)

(58) Field of Classification Search
CPC ..... B25J 17/02; B25J 19/0058; B25J 19/0075
USPC .......................................... 277/583, 605, 646
See application file for complete search history.

(56) References Cited

U.S. PATENT DOCUMENTS 2,863,681 A * 12/1958 Robbins ................. F16L 17/10
                                                 277/558
3,330,563 A *  7/1967 Frank ...................... F16J 15/46
                                                 277/583
3,337,222 A *  8/1967 Watt ........................ F16J 15/46
                                                 277/350

(Continued)

FOREIGN PATENT DOCUMENTS

CN         203757001       *   8/2014
CN         107791275 A         3/2018

(Continued)

OTHER PUBLICATIONS

Internation Search Report and Written Opinion of the International Searching Authority; Application No. PCT/EP2018/073171; Completed: May 22, 2019; dated Jun. 24, 2019; 11 Pages.

(Continued)

*Primary Examiner* — William C Joyce
(74) *Attorney, Agent, or Firm* — Whitmyer IP Group LLC (57) ABSTRACT

A robot joint including a first part and a second part arranged to have a relative movement in between, and a joint gap spacing the first part and the second part from each other, wherein the robot joint includes an inflatable seal accommodated in the joint gap to provide a fluid-tight sealing of the joint. The disclosure also relates to a robot including the robot joint, a system including the robot and a method for sealing a joint gap of a robot joint.

18 Claims, 5 Drawing Sheets

(56) References Cited

U.S. PATENT DOCUMENTS

| | | | | | |
|---|---|---|---|---|---|
| 3,628,798 | A | * | 12/1971 | Mehlhope | F16J 15/24 |
| | | | | | 277/583 |
| 3,860,270 | A | * | 1/1975 | Arnold | F16L 37/002 |
| | | | | | 277/625 |
| 4,394,021 | A | * | 7/1983 | Merila | F16J 15/24 |
| | | | | | 277/389 |
| 4,579,192 | A | * | 4/1986 | Mueller | F16J 15/46 |
| | | | | | 180/281 |
| 7,878,088 | B2 | | 2/2011 | Tamura et al. | |
| 7,959,199 | B2 | * | 6/2011 | Horiuchi | B25J 19/0075 |
| | | | | | 294/106 |
| 10,396,618 | B2 | * | 8/2019 | Kawashima | H02K 5/124 |
| 2016/0273659 | A1 | * | 9/2016 | Delaby | F16C 33/782 |

FOREIGN PATENT DOCUMENTS

| | | |
|---|---|---|
| DE | 10007831 C1 | 8/2001 |
| EP | 1541296 A1 | 6/2005 |
| EP | 2730821 A1 | 5/2014 |
| GB | 1411544 A | 10/1975 |
| JP | 06-101768 * | 4/1994 |
| WO | 2014087615 A1 | 6/2014 |

OTHER PUBLICATIONS

European Search Report; Application No. 18 762 490.3; dated Nov. 2, 2021; 5 Pages.

* cited by examiner

ROBOT JOINT AND METHOD FOR SEALING A JOINT GAP OF A ROBOT JOINT

TECHNICAL FIELD

The present disclosure relates to fluid-tight sealing of robot joints, and in particular sealing of a robot joint comprising a first part and a second part with a relative movement in between. The disclosure also relates to a robot comprising at least one such joint, a system comprising the robot and a method for sealing a robot joint.

BACKGROUND

Equipment used in the food processing of protein industry (that is meat, poultry, fish, seafood and dairy) is subject to strict hygiene requirements and must be washed down daily using hot high pressure water and chemical agents. A robot intended for food processing in wash down applications should have a complete stainless-steel frame which is hygienically designed to be easy to clean. The robot needs to have a high water protection rating—Ingress Protection 69K (IP69K). The IP69K rating defines what is needed to provide protection against ingress of dust and high temperature, high pressure water—making products with this certification suitable for use in conditions where equipment must be carefully sanitized. In industries such as food processing, where hygiene and cleanliness is paramount, equipment must be able to withstand rigorous high pressure, high temperature wash-down procedures. In many industries, where dust and dirt can be an issue, it is important to ensure that dust and dirt cannot penetrate the casing of a product and cause it to fail.

Even if the robot is provided with a stainless-steel frame, the joints may be a source to contamination. Therefore, the joints of a robot should be sealed such that no fluid or material can enter the joints during working or wash down, and also avoid that fluid such as grease can come out of the joints and potentially contaminate the food that is being processed. For example, from U.S. Pat. No. 7,878,088B2 it is known to have a sealing device for a joint section of a robot. The sealing device comprises overlapped seal portions having a multi-stage configuration.

SUMMARY

Since the joint seal bridges two robot arms, the seal will be subjected to sustained dynamic loads as long as the robot operates. Eventually the seal will be worn extensively and could no longer protect against contamination/water ingression. In most cases, the wear happens at the contact surface due to shear load. The shear load is proportional to the axial load applied on the seal, or, in other words, the clamping force.

It is an object of the disclosure to alleviate at least some of the drawbacks with the prior art. It is an object to provide a robot joint sealing solution that provides a fluid tight sealing of the joint with a minimum wear-down of the same. This object and others are at least partly achieved by a robot joint, a robot, a system, and a method according to the independent claims, and by the embodiments according to the dependent claims.

According to a first aspect, the disclosure relates to a robot joint comprising a first part and a second part arranged to have a relative movement in between, and a joint gap spacing the first part and the second part from each other. The robot joint comprises an inflatable seal accommodated in the joint gap to provide a fluid-tight sealing of the joint. This solution provides a flexible sealing, especially for hygienic robot joints, as the seal is inflatable. The robot joint with the inflatable seal solves the conflicting requirements for a single joint seal, to both provide a fluid tight sealing and to enable relative movement of the first part and second part of the joint. The solution enables the robot joint to work in different modes with equivalent efficiency. The result may be better sealing performance and long life time of the seal, with an implied cost reduction due to the long life time of the seal. The design is rather simple and compact, and the cost for implementing and using the seal is thus low. The design is also hygienic due to less risk and/or less amount of worn particle emission.

According to some embodiments, the joint gap is annular. According to some embodiments, the inflatable seal is annular. Thus, the inflatable seal may match the shape of the joint gap, such that may be used for efficient sealing of an annular joint gap.

According to some embodiments, the first part and/or the second part has a structure designed to force the inflatable seal to expand in a direction towards the second part when inflating the inflatable seal. Thereby, the inflatable seal can be controlled in a predetermined manner to seal the joint gap according to different needs.

According to some embodiments, the first part comprises a first axially extending structure delimiting the inflatable seal against the exterior of the robot joint, and a second axially extending structure, the first axially extending structure and the second axially extending structure delimiting a space where the inflatable seal is accommodated, and wherein the first axially extending structure and the second axially extending structure are designed to force the inflatable seal to expand in a direction towards the second part when inflating the inflatable seal. Thus, the first structure and the second structure guide the inflatable seal to expand in a certain direction.

According to some embodiments, the structure is designed to prevent radial expansion of the inflatable seal. Thereby, the expansion of the inflatable seal can be controlled to expand in a desired axial direction.

According to some embodiments, the inflatable seal is attached to the first part. Thereby, the inflatable seal will not change its position with respect to the first part, for example become twisted, and thereby compromise the sealing function.

According to a second aspect, the disclosure relates to a robot comprising at least one robot joint as has been previously described. Thus, the robot joints may be efficiently sealed, where the sealing can be adapted.

According to a third aspect, the disclosure relates to a system comprising a robot as previously described, a control unit, a valve arrangement and a tube arrangement fluidly connected to a source of pressurized fluid and to the inflatable seal. The control unit is programmed to pressurize the inflatable seal by means of the valve arrangement and the tube arrangement such that the inflatable seal expands in an axial direction towards the second part to seal the joint gap between the first part and the second part. Thus, the sealing function of the inflatable seal can be controlled to efficiently seal the joint.

According to some embodiments, the control unit is configured to control the valve arrangement to pressurize the inflatable seal in synchronization with the robot operation. Thus, the sealing function of the inflatable seal can be controlled to efficiently seal the joint adapted to the operation of the robot such that the seal is spared from wear.

According to some embodiments, the control unit is configured to control the valve arrangement to pressurize the inflatable seal in synchronization with the robot operation, such that the inflatable seal is pressurized to a predetermined low pressure when the robot is working, and to a predetermined high pressure when the robot is exposed to high pressure wash down and/or is shut down, wherein the predetermined high pressure is higher that the predetermined low pressure. Thereby, the wear of the inflatable seal may be lowered, as the inflatable seal is pressed against the sealing surface of the second part with a lower clamping force when joint parts are moving, than when the joint parts are not moving, such that the friction between the sealing surface and the inflatable seal becomes less and thereby decreases wear. During wash-down, the robot is normally not powered or at least not operating, but the joints have to withstand high pressure. By inflating the inflatable seals to a high pressure during wash-down, the inflated inflatable seals provide an efficient sealing during the wash-down.

According to some embodiments, the robot comprises a plurality of robot joints as previously described, where the inflatable seals are fluidly connected in series by means of the tube arrangement. Thereby, a plurality of robot joints may be sealed efficiently at the same time.

According to a fourth aspect, the disclosure relates to a method for sealing a joint gap of a robot joint. The robot joint comprises a first part and a second part with a relative movement in between, and the joint gap spaces the first part and the second part from each other. The robot joint comprises an inflatable seal accommodated in the joint gap to provide a fluid-tight sealing of the joint. The method comprises pressurizing the inflatable seal such that the inflatable seal expands in an axial direction towards the second part to seal the joint gap between the first part and the second part. Thus, the sealing function of the inflatable seal can be controlled to efficiently seal the joint.

According to some embodiments, the method comprises pressurizing the inflatable seal in synchronization with the robot operation. Thus, the sealing function of the inflatable seal can be controlled to efficiently seal the joint adapted to the operation of the robot such that the seal is spared from wear.

According to some embodiments, the method comprises pressurizing the inflatable seal to a predetermined low pressure, upon receiving an indication that the robot is working; and pressurizing the inflatable seal to a predetermined high pressure upon receiving an indication that the robot is not working and/or is exposed to wash down, wherein the predetermined high pressure is higher that the predetermined low pressure. Thereby the wear of the inflatable seal may be lowered, while still providing an efficient sealing.

According to a fifth aspect, the disclosure relates to a computer program, wherein the computer program comprises a computer program code to cause a control unit, or a computer connected to the control unit, to perform the method as described herein.

According to a sixth aspect, the disclosure relates to a computer program product comprising a computer program code stored on a computer-readable medium to perform the method as described herein, when the computer program code is executed by a control unit or by a computer connected to said control unit.

DETAILED DESCRIPTION

In the following a robot joint will be described that has a fluid-tight sealing of the joint, and also a robot comprising at least one such robot joint, a system comprising the robot and a method for sealing such a robot joint.

The herein described robot joint is provided with a seal that is inflatable. The inflatable seal is provided in a joint gap spacing a first part and a second part of the robot joint, with a relative movement in between. With such a robot joint, it is possible to meet conflicting requirements found for a single joint seal, thus to both seal the joint and allow the parts of the joint to move in relation to each other, because the inflatable seal can be made to work in different modes. In a first mode, the inflatable seal provides operational protection. For example, when the robot operates in a meat processing factory, the inflatable seal shall protect against external contamination, such as incoming blood splashes. In this case, the contact pressure between the inflatable seal and a sealing face of the second part shall be set just at minimum level, so as to minimize the wear of the inflatable seal, while still providing a sealing function of the joint gap. In the second mode, the inflatable seal provides wash-down protection. During that phase, the joint seal shall protect against high pressure/temperature water jet. Since the robot is kept stationary during wash-down, that is, no part is moving, there is no concern regarding the shear load (friction force) on the inflatable seal. In this case, ideally, the contact pressure between the inflatable seal and the sealing face of the second part shall be set as high as possible, so as to maximize sealing capability. Thus, by minimizing the axial load of the inflatable seal of the joint during robot operation, the seal life time may be prolonged. Obviously, a fixed-profile seal could hardly fulfil the requirements for different operating modes, while by introducing an inflatable seal, the sealing becomes flexible.

Figure 1A:
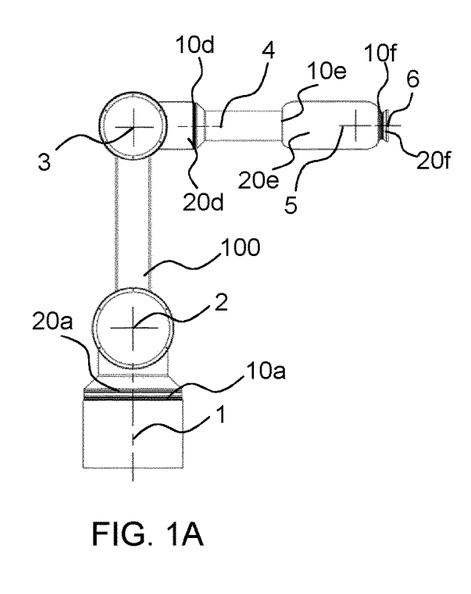
FIGS. 1A-1B illustrate a robot from two different views, the robot comprises a plurality of joints each provided with an inflatable seal as disclosed herein.
Figure 1B:
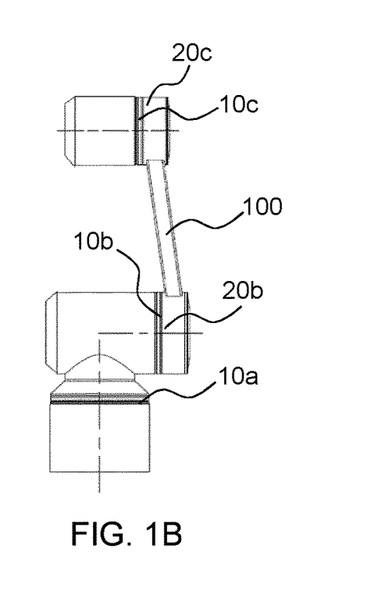
Figure 3:
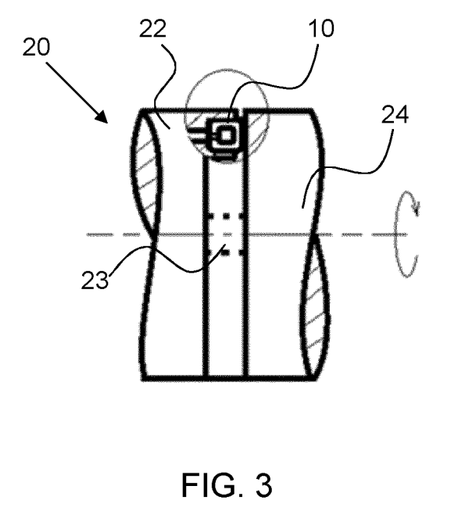
FIG. 3 illustrates a detail of a robot joint provided with an inflatable seal according to some embodiments. The inflatable seal is illustrated in cross-section.

FIGS. 1A and 1B illustrate an industrial robot 100 with six (6) axes 1-6, hereafter referred to as "robot 100". The robot 100 is a programmable robot that has six degrees of freedom (DOF). Each axis comprises a driving mechanism (not shown) for driving an arm or a wrist. The driving mechanism comprises a driving motor, for example a brushless DC motor. A transmission comprising speed reducers and/or gearboxes transmits the torque from the driving motor, via an output shaft of the driving motor, to the joint 20 of the axis. The joint 20 comprises a first part 22 and second part 24 (FIG. 3). The first part 22 is typically arranged stationary in relation to the driving motor of the axis, and the second part 24 is arranged in relation to the outgoing shaft of the driving motor, and rotates in accordance with the rotation of the arm or wrist of the axis. Thus, the second part 24 will then rotate in relation to the first part 22 when the joint is operated. The first part 22 and the second part 24 are thus rotatable in relation to each other. Between the first part 22 and second part 24 there is a joint gap 26 (FIG. 4), and an inflatable seal 10 is arranged to seal the joint gap 26. Thus, the inflatable seal 10 is arranged to seal the first part 22 and the second part 24. In the robot 100 of 1A and 1B, each joint is sealed with an inflatable seal. That is, the joint gap of the joint 20a of the first axis 1 is sealed with a first inflatable seal 10a, the joint gap of the joint 20b of the second axis 2 is sealed with a second inflatable seal 10b, the joint gap of the joint 20c of the third axis 3 is sealed with a third inflatable seal 10c, the joint gap of the joint 20d of the fourth axis 4 is sealed with a fourth inflatable seal 10d, the joint gap of the joint 20e of the fifth axis 5 is sealed with a fifth inflatable seal 10e and the joint gap of the joint 20f of the sixth axis 6 is sealed with a sixth inflatable seal 10f. It should be understood that a robot may comprise more or less joints than six, and thus more or less inflatable seals than six. It should also be understood that the number of inflatable seals may be less than the number of joints i.e., not every joint needs to comprise an inflatable seal.

Figure 2A:
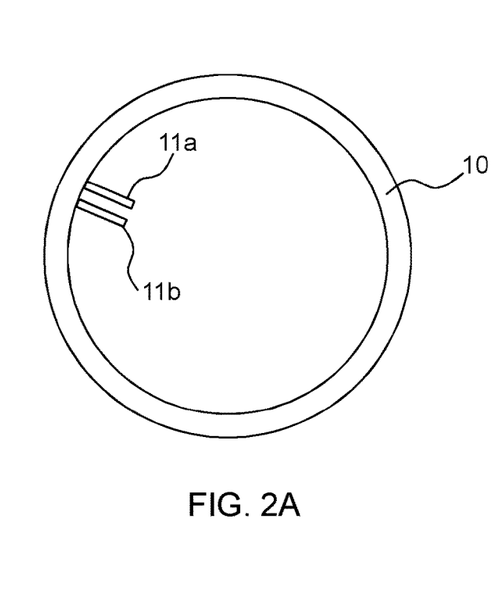
FIGS. 2A-2B illustrate inflatable seals according to some embodiments.
Figure 2B:
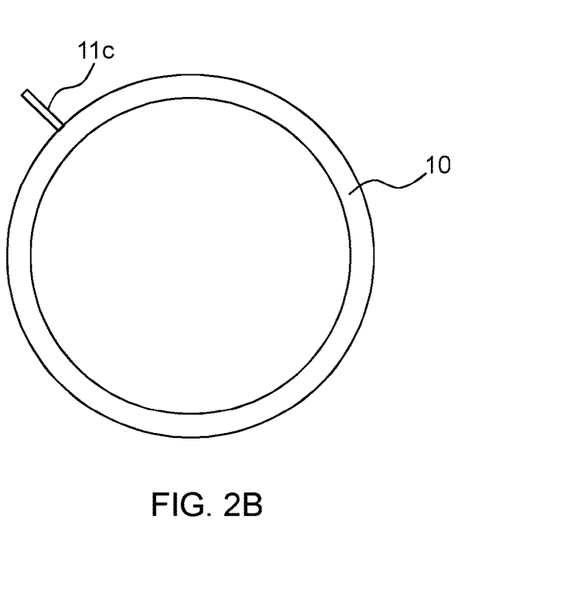

FIGS. 2A and 2B illustrate inflatable seals 10 according to two different embodiments of the invention, that can be used as the inflatable seals 10a-10f in FIGS. 1A-1B, in isolation. The inflatable seal 10 may be produced from elastomers with high modulus of elasticity and considerable elongation. For example, the inflatable seal 10 can be made of silicone, styrene butadiene rubber or ethylene propylene. The material may be provided with an agent preventing bacterial and microbial growth, to meet the needs of hygienic applications. The inflatable seal 10 may be produced by joining together extruded or molded sections. The inflatable seal 10 can thus be made into one, single, integrated piece.

The inflatable seal 10 is hollow and can be inflated by providing pressurized fluid to the interior of the inflatable seal 10 via an inlet 11a. The fluid of the inflatable seal 10 may be expelled via an outlet 11b. Such an embodiment is illustrated in FIG. 2A. The inlet 11a and the outlet 11b comprise small tubes that are rigidly attached, or integrated in, to the inflatable seal 10, and fluidly communicate with the interior of the inflatable seal 10. Alternatively, a common inlet/outlet 11c is provided via the same tube, as illustrated in FIG. 2B. The inflatable seal 10 has a circular shape, for example the shape of a hollow torus. In one embodiment, the inflatable seal 10 has the shape of an inflatable tube, for example similar to an inner tube of a bike wheel.

FIG. 3 illustrates a robot joint 20, for example one of the robot joints 20a-20f of FIGS. 1A-1B, from the exterior of the joint 20. As mentioned, the robot joint 20 comprises a first part 22 and a second part 24 arranged to have a relative movement in between. Thus, the first part 22 and the second part 24 are movably arranged in relation to each other, and thereby allow a relative movement between them. The output shaft 23 of the axis comprising the joint 20 is schematically illustrated in the figure with the dotted lines. The output shaft 23 thus connects the first part 22 and the second part 24 of the joint. The robot joint also comprises a joint gap 26 (FIG. 4) spacing the first part 22 and the second part 24 from each other. The robot joint 20 comprises an inflatable seal 10 accommodated in the joint gap 26, to provide a fluid-tight sealing of the joint 20. In FIG. 3, the inflatable seal 10 is illustrated in cross-section.

Figure 4:
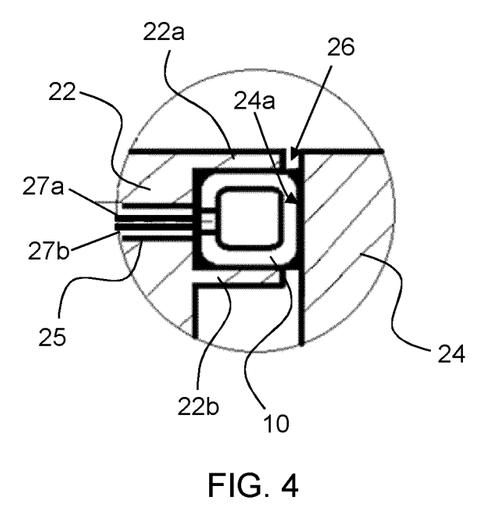
FIG. 4 illustrates an enlarged view of the cross-section of the inflatable seal of FIG. 3.

FIG. 4 illustrates an enlarged detail of FIG. 3, namely a cross-section of the inflatable seal 10. The first part 22 comprises a groove delimiting the inflatable seal 10 from three sides such as to force the inflatable seal 10 to expand in a direction towards the second part 24 when inflating the inflatable seal 10, and thereby closing the joint gap 26. In more detail, the first part 22 may comprise a first axially extending structure 22a, or wall part, delimiting the inflatable seal 10 against the exterior of the robot joint 20. The first part 22 may also comprise a second axially extending structure 22b, or wall part, that delimits the inflatable seal 10 against the interior of the robot joint 20.

In one embodiment, to make sure the inflatable seal 10 does not change its position in the housing, the inflatable seal 10 is assembled or attached to the first part 22, for example by mechanical retaining and/or by gluing.

The inflatable seal 10 is arranged to receive pneumatic supply through the inlet 11a (FIG. 2), to change its profile. The contact pressure between the inflatable seal 10 and the inner face 24a of the second part 24 can be adjusted by adjusting the inner pressure of the inflatable seal 10, to adapt to different operating modes of the joint. During a wash-down, it may require a contact pressure as high as possible to secure the sealing capability against water jet, while during a regular operation mode, a lower contact pressure is needed to seal off casual external contaminations. The inner pressure for providing a low contact pressure, thus a contact pressure required to seal off external ingressions, may be set to an atmospheric pressure. This mode is also referred to as the first mode, and the inner pressure is referred to as a predetermined low pressure. The inner pressure for providing a high contact pressure should be high enough to withstand impact force from the wash down. This mode is also referred to as the second mode, and the inner pressure is referred to as a predetermined high pressure. It should be emphasized that during any mode, the inflatable seal 10 is securely sealing the robot joint. The contact pressure is the pressure of the inflatable seal 10 against the inner face 24a, or sealing face, of the second part 24.

As illustrated in FIG. 4, the first part 22 comprises a channel 25, in which a first tube 27a is provided and attached to the inlet 11a for inflating the inflatable seal 10, and a second tube 27b is provided and attached to the outlet tube 11b for deflating the inflatable seal 10. This embodiment corresponds to the inflatable seal 10 illustrated in FIG. 2A, and the seals 10a-10f in FIG. 8. Instead, the channel 25 may comprise only one tube 27 attached to a common inlet/outlet 11c of the seal 10, corresponding to the inflatable seal 10 illustrated in FIG. 2B and the seals 10a-10f in FIG. 9.

It is to be expected that dirt and/or bacteria will contaminate not only the part of the joint gap 26 delimited by the first part 22, the second part 24 and the inflatable seal 10 and being open towards the exterior of the robot joint 20, but also small distances within the interfaces between the inflatable seal 10 and the first part 22 and/or the second part 24. That is, dirt and/or bacteria is expected to intrude between the inflatable seal 10 and the first part 22 and/or the second part 24. It is furthermore expected that the interfaces between the inflatable seal 10 and the first part 22 and/or the second part 24 are particularly challenging to be properly cleaned during a wash-down. If the inflatable seal 10 consists of a homogenous material, inflating the same causes the inflatable seal 10 to be pressed even stronger against the first part 22 and the second part 24 at the region towards the exterior of the robot joint 20, and thereby further counteracts the cleaning of the respective interfaces.

Figure 5:
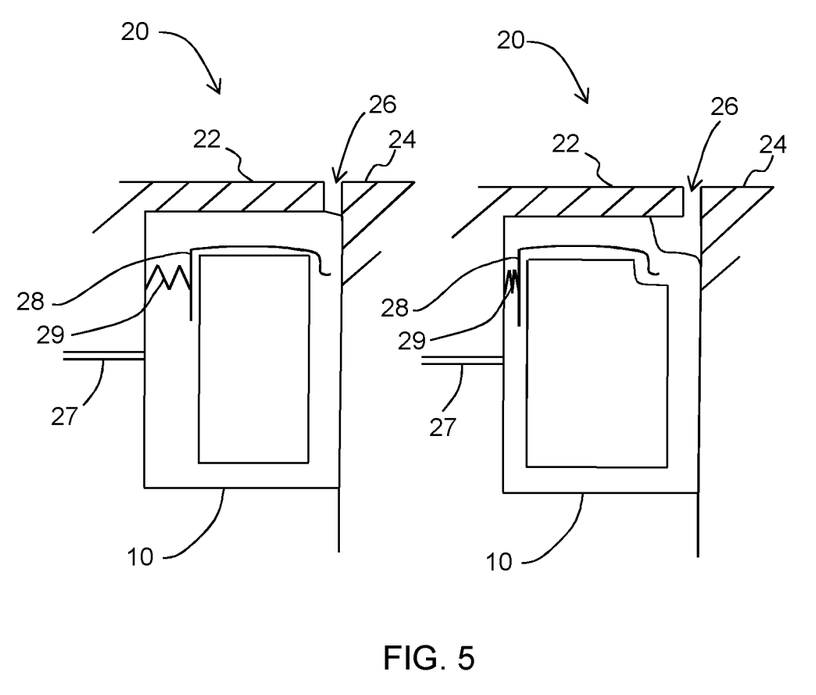
FIG. 5 illustrates a cross-section of an inflatable seal according to some embodiments, when provided in a robot joint.

Referring to FIG. 5, in order to mitigate the aforementioned issue, according to one embodiment of the inflatable seal 10 the same is designed to strongly change its shape at the region open towards the exterior of the robot joint 20. In order to achieve this, the outer portion of the inflatable seal 10 in radial direction is provided with an enforcement 28 in the form of a profile or profiles made of spring steel. The enforcement 28 is stiff in relation to the surrounding relatively flexible material, and thereby it provides the inflatable seal 10 with a non-homogenous structure. The relatively flexible material in effect functions as a spring 29 allowing the interior of the inflatable seal 10 to expand towards the surrounding walls, but at the same time counteracting the force exerted by the pressurized air, as schematically illustrated in FIG. 5. The enforcement 28 has a larger area exposed to pressurized air on the side of the first part 22 compared to that on the side of the second part 24, which causes the enforcement 28 to move towards the first part 22 at inflation of the inflatable seal 10. As the remainder of the inflatable seal 10 consists of relatively flexible material, this movement in its turn causes the inflatable seal 10 to strongly change its shape at the region open towards the exterior of the robot joint 20 such as to effectively expose the respective interfaces for cleaning.

In the following processes of pressurizing the one or several inflatable seals 10 of the robot 100 will be described.

Figures 6, 7:
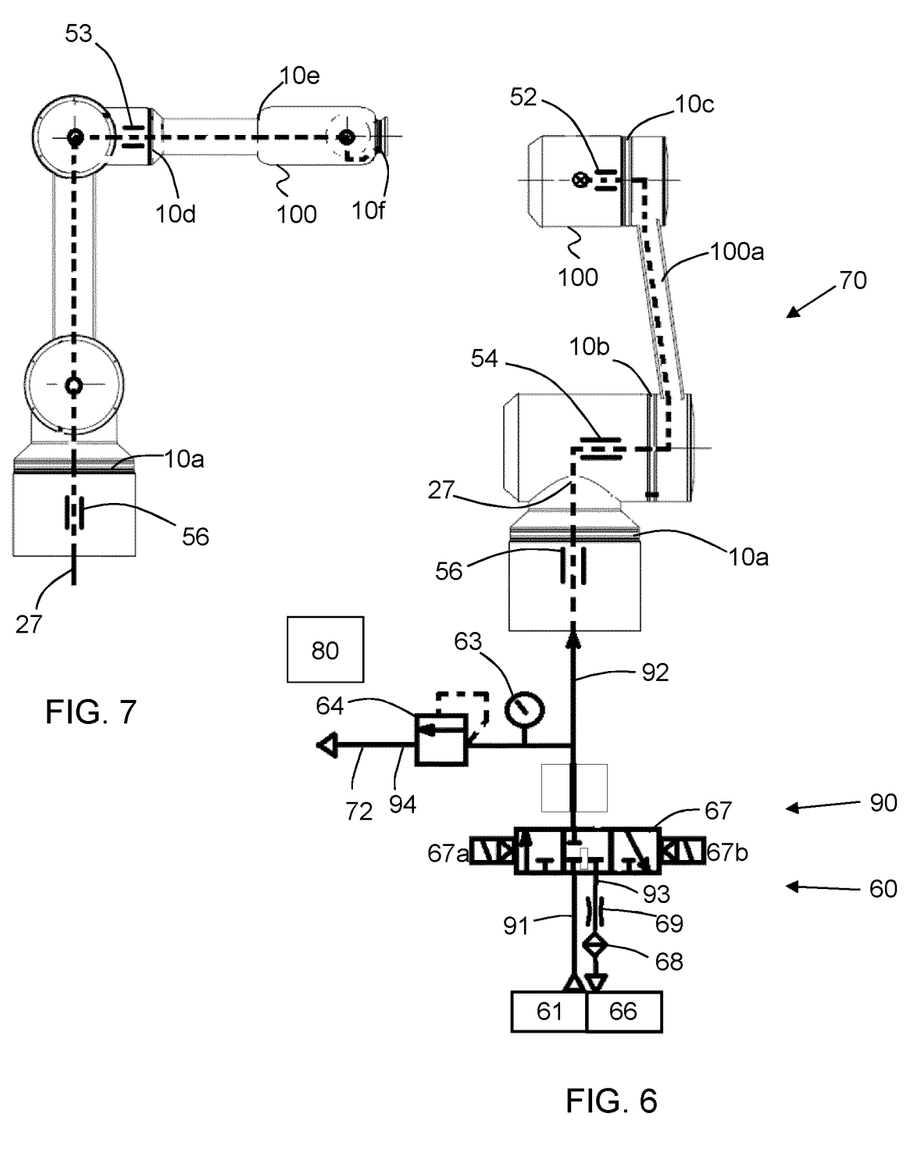
FIG. 6 illustrates a robot with an arrangement for passing pressurized fluid in a fluid line arranged to the robot.
FIG. 7 illustrates a robot with a fluid line for passing pressurized fluid.

FIGS. 6 and 7 illustrate a system 70 comprising a robot 100 as described above, with a plurality of axes and joints, and inflatable seals 10a-sealing the joint gaps of the joints. FIG. 6 illustrates the whole system 70, whereas FIG. 7 illustrates the robot 100 in another view to show axis 5 and 6 that are not visible in FIG. 6, but for simplicity without all parts of the system 70. The system 70 also comprises a control unit 80, a valve arrangement 60 and a tube arrangement 90 fluidly connected to the source 61 of pressurized fluid and to the inflatable seals 10a-10f.

For working applications, the robot 100 may be in need of pressurized fluid, and normally the robot 100 is already located in connection to a source 61 of pressurized fluid. In FIG. 6, this source 61 of pressurized fluid is depicted as a box, but it should be understood that the source may include a container with pressurized fluid, a compressor for pressurizing the fluid etc.

Figure 9:
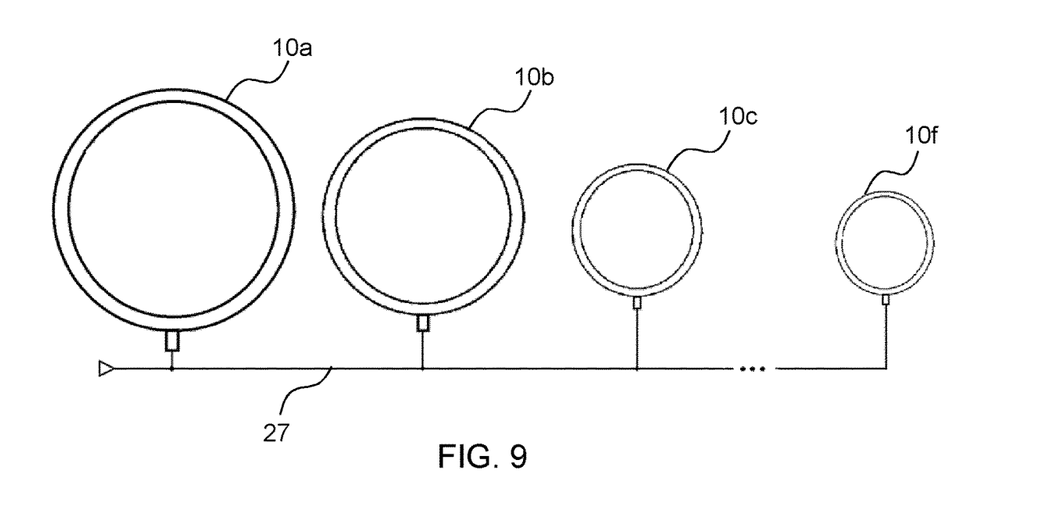
FIG. 9 illustrates a plurality of inflatable seals arranged in parallel.

In FIGS. 6 and 7, the plurality of inflatable seals 10a-10f are fluidly connected in parallel as also is illustrated in FIG. 9. The same fluid tube 27 in the robot 100 is then used for deflation and inflation of the inflatable seals 10a-10f, and the fluid tube 27 is being passed through hollow spaces of the robot 100, for example through hollow shafts 52, 53, 54 and 56 and inside an enclosure 100a of the robot 100, to fluidly connect to all seals 10a-10f. In one embodiment, and in operation, the pressurized fluid is guided in the system 70 from a source 61 via a fluid line 27 inside the robot 100 to the furthest away located inflatable seal 10f, that is here sealing axis six. The valve arrangement comprises a three-position valve 67 and a first valve 64. The tube arrangement 90 comprises a first fluid line 91, a second fluid line 92, a third fluid line 93 and a fourth fluid line 94. The first fluid line 91 is connected between the source 61 and the three-position valve 67. The second fluid line 92 is connected between the three-position valve 67 and the fluid tube 27. The third fluid line 93 is connected between the three-position valve 67 and an outlet 66. The fluid may be passed out from the system 70 to the outlet 66 for recycling the pressurized fluid, here schematically illustrated as a box. The fourth fluid line 94 connects the second fluid line 92 to the atmosphere. The fourth fluid line 94 is fitted with the first valve 64 and a manometer 63. The default position of the valve 67 is to keep all flow terminals of the valve closed, which here is the middle position of the valve 67, also referred to as a closed state. Before operating the robot 100, a valve coil 67b is first energized, which ensures that all joint seals 10a-10f are deflated, so all joint seals 10a-10f keep minimum required contact force against contact surfaces. This corresponds to the right-hand side position of the valve 67, whereby the air in the joint seals 10a-10f is passed to the outlet 66 for recycling the pressurized fluid, whereby the pressure in the joint seals 10a-10f will correspond to atmospheric pressure. Before wash down of the robot 100, valve coil 67a is first energized and hold in its energized position, which allows pressurized gas to be passed into the joint seals 10a-10f to inflate the same. When the pressure inside the second fluid line 92 and thus also the fourth fluid line 94 reaches a desired pressure value, the manometer 63 will indicate this to the control unit 80, which triggers a signal to be sent that de-energizes the valve coil 67a, whereby the valve 67 returns to its default position and keeps the pressure in the joint seals 10a-10f stable. A minimum threshold and/or maximum threshold can be set in the control unit 80, such that in case of pressure change, the air pressure in the joint seals 10a-10f can be regulated back to the desired value. The valve arrangement 60 and the tube arrangement 90 may comprise a filter 68 and an orifice 69 arranged to the third fluid line 93.

The valves herein are for example hydraulically, pneumatically, or electrically controlled valves, that comprises springs and operators to change the state of the valves and thus the direction of the flow.

The control unit 80 is schematically illustrated in the FIG. 6 with a box, and it is understood that the control unit 80 is connected by wire or wirelessly to the valve 67 and to first valve 64, and in some embodiments to the manometer 63. The control unit 80 is programmed to pressurize the inflatable seals 10a-10f by means of the valve arrangement 60 and the tube arrangement 90. By pressurizing the seals 10a-10f, the inflatable seals 10a-10f can be made to expand in an axial direction towards the second part 24 of each robot joint, to seal the joint gap between the first part 22 and the second part 24 of each robot joint with a high contact pressure. The control unit 80 is also programmed to de-pressurize the inflatable seals 10a-10f by means of the valve arrangement 60 and the tube arrangement 90 such that the inflatable seals 10a-10f contract in an axial direction towards the first part 22 of each robot joint, to lower the contact pressure from the inflatable seal on each robot joint.

The control unit 80 is configured to control the valve arrangement 60 to pressurize the inflatable seals 10a-10f in synchronization with the robot operation. For example, the control unit 80 is arranged to provide power to the valve arrangement 60 in synchronization with the robot operation, thus, when the robot 100 is operating, the valve arrangement 60 is also powered, and when the robot 100 is not operating or is not powered, the valve arrangement 60 is also not powered. In one embodiment, the control unit 80 is configured to control the valve arrangement 60 to pressurize the inflatable seals 10a-10f, such that the inflatable seals 10a-10f are pressurized to a predetermined low pressure when the robot 100 is working, and to a predetermined high pressure when the robot 100 is exposed to high pressure wash down and/or is shut down. The control unit 80 may for that purpose monitor the operation of the robot 100 to understand when the robot is exposed to wash-down, is operating or not operating etc. The control unit 80 may for example receive one or several signals from the robot 100 indicating the status of the same, that is, if the robot 100 is exposed to wash-down, whether it is operating or not, and whether it is powered. This functionality may alternatively be incorporated with the powering to the robot 100, and thus, when the robot 100 is powered, the valves 64, 67 are also powered (to inflate or deflate seals 10a-10f), and when the robot 100 is not powered, the valves 64, 67 are also not powered (to maintain the pressure in the seals 10a-10f).

More in detail, the control unit 80 comprises a processor and a memory. The control unit 80 is for example an external computer, or a robot controller of the robot 100. The memory may include a computer program, wherein the computer program comprises a computer program code to cause the control unit 80, or a computer connected to the control unit 80, to perform the method as will be described in the following. The program may be stored on a computer-readable medium, such as a memory stick or a CD ROOM. A computer program product may comprise a computer program code stored on such a computer-readable medium to perform the method as described herein, when the computer program code is executed by the control unit 80 or by a computer connected to the control unit 80.

Figure 8:
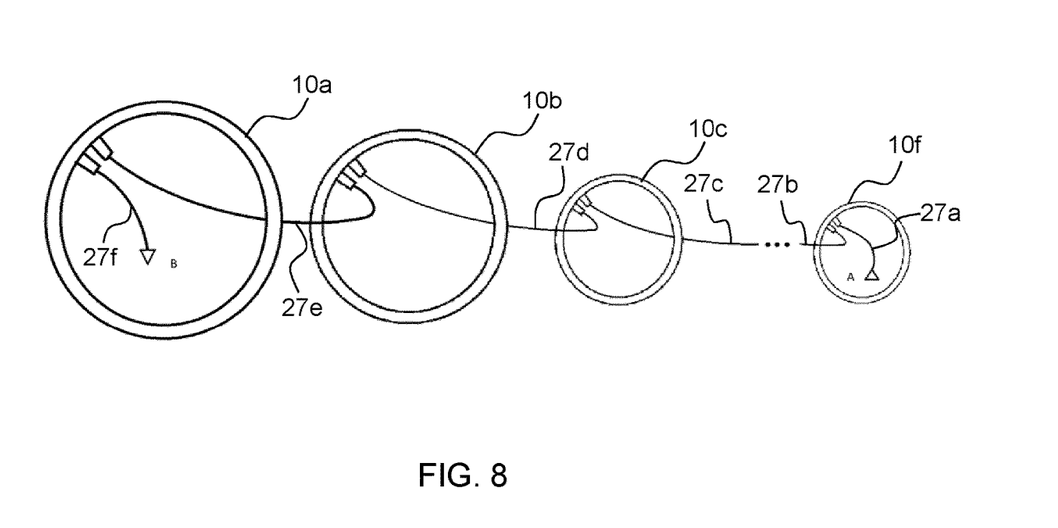
FIG. 8 illustrates a plurality of inflatable seals arranged in series.

FIG. 8 illustrates the plurality of inflatable seals 10a-10f (in isolation) while connected in series by means of the tube arrangement 90, according to one embodiment. The inflatable seals have different diameters to fit in the joint gap of the corresponding joint. The fourth inflatable seal 10d and the fifth inflatable seal 10e have been omitted for simplicity. The tube arrangement 90 includes the tubes 27a-27f. Each tube in the tube arrangement (except the first tube 27a and the last tube 27f) connects an inflatable seal with a next closest inflatable seal. For example, the tube 27e connects the second inflatable seal 10b with the first inflatable seal 10a, and the tube 27d connects the second inflatable seal 10b with the third inflatable seal 10c.

FIG. 9 illustrates the plurality of inflatable seals 10a-10f (in isolation) while connected in parallel by means of the tube arrangement 90 including the tube 27, according to another embodiment. Thus, the tube 27 connects all the plurality of inflatable seals 10a-10f in parallel.

Figure 10:
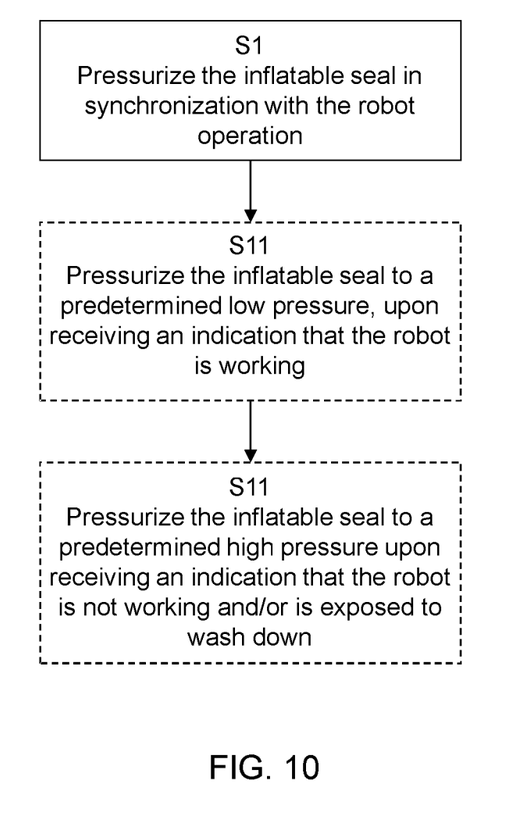
FIG. 10 illustrates a method for sealing a joint gap of a robot joint according to some embodiments.

In the following a corresponding method for sealing a joint gap 26 of a robot joint 20 will be illustrated with reference to the flow chart of FIG. 10. It should be understood that the method may be used for sealing joint gaps 26 of a plurality of joints of the robot 100 by means of a plurality of inflatable joints 10, but the method is here for simplicity explained with reference to sealing only one robot joint with an inflatable seal. The method comprises pressurizing S1 the inflatable seal 10 such that the inflatable seal expands in an axial direction towards the second part 24 to seal the joint gap 26 between the first part 22 and the second part 24. Thus, the inflatable seal 10 can be pressurized to provide a variable sealing of the robot joint. In one embodiment, the method comprises pressurizing S1 the inflatable seal 10 in synchronization with the robot operation. For example, the method comprises pressurizing S11 the inflatable seal 10 to a predetermined low pressure, upon receiving an indication that the robot 100 is working. The method may also include pressurizing S12 the inflatable seal 10 to a predetermined high pressure upon receiving an indication that the robot 100 is not working and/or is exposed to wash down. The predetermined high pressure is higher that the predetermined low pressure. The low pressure is for example atmospheric pressure.

The present invention is not limited to the above-described preferred embodiments. Various alternatives, modifications and equivalents may be used. For example, while the disclosure refers to an embodiment where the relative movement between the first part 22 and a second part 24 occurs between surfaces that are axial or at least have axial direction components, the invention can also be applied in joints between two radial surfaces, such as between a shaft and a shaft passage. Moreover, the relative movement is not limited to a rotational movement but can also contain or consist of a linear movement. Therefore, the above embodiments should not be taken as limiting the scope of the invention, which is defined by the appending claims.

The invention claimed is:

1. A system comprising:
a robot having at least one robot joint, wherein the robot joint includes a first part and a second part arranged to have a relative movement in between, and a joint gap spacing the first part and the second part from each other, wherein the robot joint includes an inflatable seal accommodated in the joint gap to provide a fluid-tight sealing of the joint,
a control unit,
a valve arrangement, and
a tube arrangement fluidly connected to a source of pressurized fluid and to the inflatable seal, wherein the control unit is programmed to pressurize the inflatable seal by means of the valve arrangement and the tube arrangement such that the inflatable seal expands in an axial direction towards the second part to seal the joint gap between the first part and the second part, and
wherein the control unit is configure to control the valve arrangement to pressurize the inflatable seal in synchronization with the robot operation, such that the inflatable seal is pressurized to a predetermined low pressure when the robot is working, and to a predetermined high pressure when the robot is exposed to high pressure wash down and/or is shut down, wherein the predetermined high pressure is higher than the predetermined low pressure.

2. The system according to claim 1, wherein the joint gap is annular.

3. The system according to claim 1, wherein the inflatable seal is annular.

4. The system according to claim 1, wherein the first part and/or the second part has a structure designed to force the inflatable seal to expand in the axial direction towards the second part when inflating the inflatable seal.

5. The system according to claim 4, wherein the first part comprises a first axially extending structure delimiting the inflatable seal against an exterior of the robot joint, and a second axially extending structure, the first axially extending structure and the second axially extending structure delimiting a space where the inflatable seal is accommodated, and wherein the first axially extending structure and the second axially extending structure are designed to force the inflatable seal to expand in the axial direction towards the second part when inflating the inflatable seal.

6. The system according to claim 4, wherein the structure is designed to prevent radial expansion of the inflatable seal.

7. The system according to claim 1, wherein the inflatable seal is attached to the first part.

8. The system according to claim 1, wherein the robot comprises a plurality of robot joints, wherein the inflatable seals are fluidly connected in series by means of the tube arrangement.

9. The system according to claim 1, wherein the relative movement occurs between surfaces that are axial or at least have axial direction components.

10. A method for sealing a joint gap of a robot joint of a robot, wherein the robot joint comprises a first part and a second part with a relative movement in between, and the joint gap spaces the first part and the second part from each other, the robot joint further including an inflatable seal accommodated in the joint gap to provide a fluid-tight sealing of the joint, wherein the method comprises:
   pressurizing the inflatable seal such that the inflatable seal expands in an axial direction towards the second part to seal the joint gap between the first part and the second part;
   wherein said pressurizing the inflatable seal includes:
      pressurizing the inflatable seal to a predetermined low pressure when the robot is working, and
      pressurizing the inflatable seal to a predetermined high pressure when the robot is not working and/or is exposed to wash down;
   wherein the predetermined high pressure is higher than the predetermined low pressure.

11. The method according to claim 10,
   wherein said pressurizing the inflatable seal is synchronized with a robot operation.

12. The method according to claim 10, wherein the step of pressurizing the inflatable seal such that the inflatable seal expands comprises pressurizing an annular inflatable seal.

13. The method according to claim 10, further comprising: forcing the inflatable seal to expand in the axial direction towards the second part when the inflatable seal is pressurized.

14. The method according to claim 13, further comprising: preventing radial expansion of the inflatable seal.

15. The method according to claim 13, further comprising: delimiting the inflatable seal against an exterior of the robot joint via a first axially extending structure of the first part, wherein the first axially extending structure and a second axially extending structure of the first part delimit a space where the inflatable seal is accommodated, and wherein the first axially extending structure and the second axially extending structure are designed to force the inflatable seal to expand in the axial direction towards the second part when pressurizing the inflatable seal.

16. The method according to claim 10, wherein the step of pressurizing the inflatable seal such that the inflatable seal expands to seal the joint gap comprises pressurizing the inflatable seal to seal an annular joint gap.

17. The method according to claim 10, wherein the step of pressurizing the inflatable seal such that the inflatable seal expands comprises pressurizing the inflatable seal while attached to the first part.

18. The method according to claim 10, further comprising: initiating the relative movement of the first part and the second part along surfaces that are axial or that at least have axial direction components.

* * * * *